(12) United States Patent
Rivera

(10) Patent No.: US 6,631,279 B2
(45) Date of Patent: Oct. 7, 2003

(54) PNEUMATIC CELL PHONE SPEAKER ASSEMBLY

(76) Inventor: Adrian Rivera, 2442 Flower St., Huntington Park, CA (US) 90255

( * ) Notice: Subject to any disclaimer, the term of this patent is extended or adjusted under 35 U.S.C. 154(b) by 0 days.

(21) Appl. No.: 09/823,420

(22) Filed: Mar. 29, 2001

(65) Prior Publication Data

US 2002/0055374 A1 May 9, 2002

Related U.S. Application Data

(63) Continuation-in-part of application No. 09/708,141, filed on Nov. 7, 2000.
(60) Provisional application No. 60/202,325, filed on May 5, 2000.

(51) Int. Cl.[7] ................................................ H04M 1/00
(52) U.S. Cl. ....................... 455/568; 455/569; 455/575; 379/430
(58) Field of Search ................................. 455/568, 569, 455/575, 90; 379/430, 431, 429, 437, 440, 433; 381/150, 370, 380, 189, 183

(56) References Cited

U.S. PATENT DOCUMENTS

| | | | |
|---|---|---|---|
| 299,300 A | 5/1884 | Warth | |
| 3,588,384 A | * 6/1971 | Negley | ........................ 381/375 |
| 3,916,312 A | * 10/1975 | Campbell | ................... 455/575 |
| 3,993,879 A | 11/1976 | Larkin | |
| 4,090,042 A | 5/1978 | Larkin | |
| 4,118,606 A | 10/1978 | Larkin | |
| 4,324,951 A | 4/1982 | Brown | |
| 4,347,911 A | 9/1982 | Bertagna et al. | |
| 4,926,961 A | 5/1990 | Gattey et al. | |
| 5,528,689 A | 6/1996 | Chan | |
| 5,613,222 A | 3/1997 | Guenther | |
| 5,812,659 A | * 9/1998 | Mauney et al. | .............. 379/430 |
| 5,832,079 A | 11/1998 | Rabe | |
| 5,909,498 A | * 6/1999 | Smith | .......................... 381/380 |
| 5,943,627 A | * 8/1999 | Kim et al. | ................... 455/569 |
| 5,963,640 A | 10/1999 | Rabe | |
| 6,021,207 A | 2/2000 | Puthuff et al. | |
| 6,181,801 B1 | 1/2001 | Puthuff et al. | .............. 381/380 |
| 6,377,824 B1 | * 4/2002 | Ingir et al. | ................... 455/568 |

FOREIGN PATENT DOCUMENTS

WO      WO 02/13492 A2      2/2002

* cited by examiner

*Primary Examiner*—Duc Nguyen
(74) *Attorney, Agent, or Firm*—Knobbe, Martens, Olson & Bear, LLP

(57) ABSTRACT

A cellular phone speaker and microphone assembly that permits the use of cellular phones in a manner that limits the user's exposure to electromagnetic radiation. The assembly comprises a speaker, a microphone, a first enclosure containing the microphone, a separate second enclosure containing the speaker, and a connecting member, which connects the first and second enclosures in a manner such that an air gap is introduced between the first and second enclosures. Furthermore, the assembly comprises a first air tube extending between the user's mouth and the enclosure containing the microphone so as to transmit sound therebetween and a second air tube extending between the user's ear and the enclosure containing the speaker so as to transmit sound therebetween. The speaker and microphone are individually encapsulated within separate enclosures so as to reduce noise interference between the two devices.

46 Claims, 5 Drawing Sheets

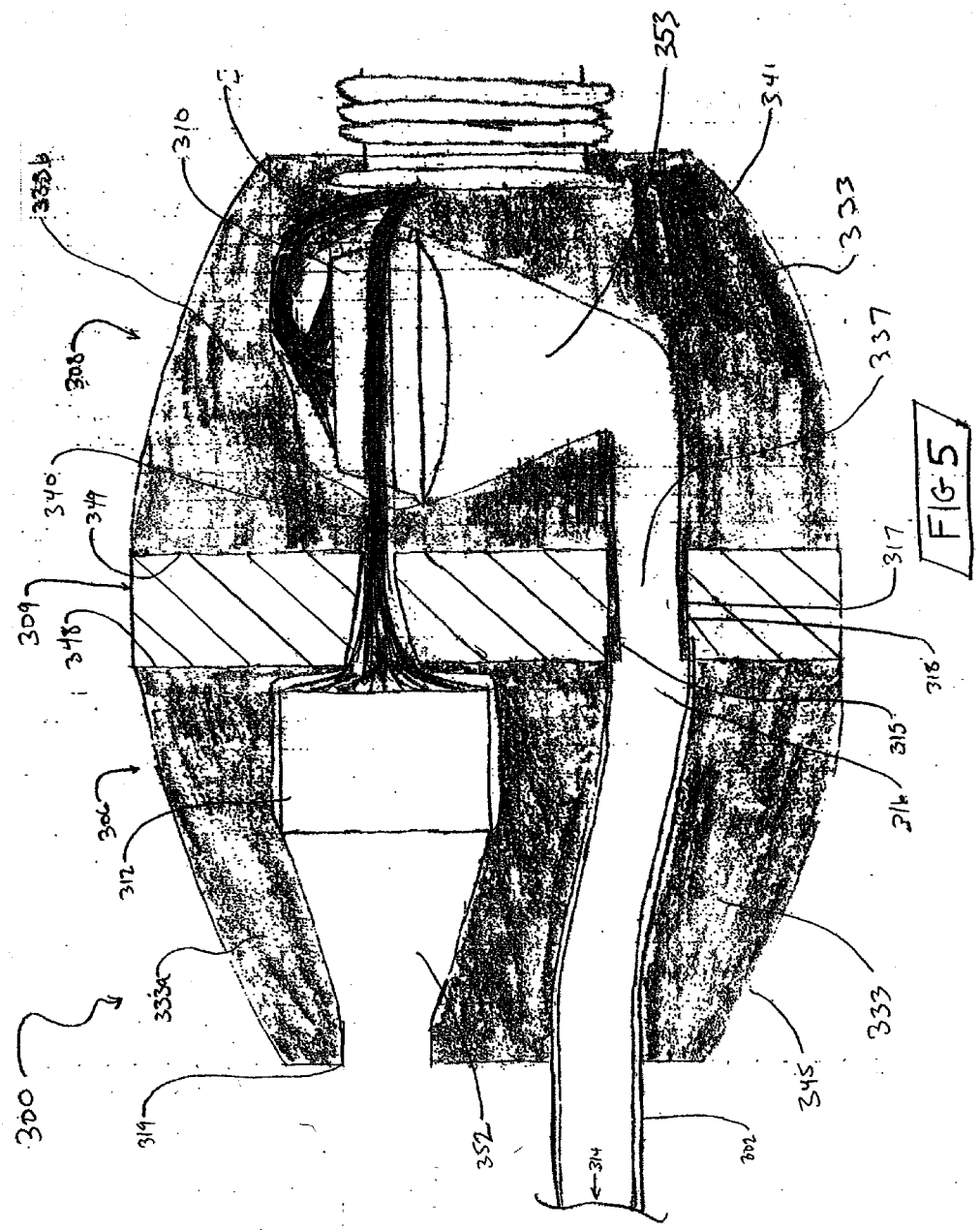

PNEUMATIC CELL PHONE SPEAKER ASSEMBLY

RELATED APPLICATIONS

This application is a continuation-in-part of U.S. patent application Ser. No. 09/708,141, filed Nov. 7, 2000, entitled "CELL PHONE SPEAKER AND MICROPHONE ASSEMBLY." This application also claims the benefit of U.S. Provisional Patent Application Ser. No. 60/202,325, filed May 5, 2000.

BACKGROUND OF THE INVENTION

1. Field of the Invention

The present invention relates to cellular telephones and, more particularly, to a cellular phone speaker and microphone assembly that permits the use of cellular phones in a manner that limits the user's exposure to electromagnetic radiation.

2. Description of the Related Art

Cellular telephones are handheld devices that are usually positioned immediately adjacent the ear and face of the user when in use. They operate by transmitting and receiving wireless signals to and from a remote cell site. As a consequence, they generate and receive electromagnetic radiation that can be harmful to individuals. In particular, when the cellular phone is transmitting to the cell site, electromagnetic radiation emits from the phone at a location adjacent the head of the user. It is believed that prolonged exposure to such electromagnetic radiation can pose health risks to the cellular phone user including increased incidence of brain tumors and cancer.

To address this concern, some microphone and speaker assemblies have been developed for the cellular phone to allow for the use of cellular phones without requiring the phone being placed immediately adjacent the user's head. These assemblies typically involve attaching an electronic microphone and speaker by wire to the cellular phone in a manner so that only the speaker and microphone are adjacent the ear and mouth of the user while the cellular phone is being used. An electronic signal produced by the cellular phone is then transmitted along the electrical wire to the speaker and subsequently transformed into an audio signal by the speaker located adjacent the user's ear. Furthermore, the electronic microphone that is positioned adjacent the user's mouth converts audible voice signals produced by the user into electronic signals which in turn are transmitted via the wire to the cellular phone for subsequent transmission to the cell site.

While these speaker and microphone assemblies somewhat reduce the user's exposure to electromagnetic radiation generated by the cellular phone, they still raise some health concerns as these assemblies themselves can be a source of electromagnetic radiation. In particular, these assemblies typically use an electrical conductor such as a metal wire to connect the speaker with the microphone and to transmit electronic signals to and from these devices. Disadvantageously, it is believed that the metal wire can act as an antenna which can receive and transmit electromagnetic radiation, thereby continuing to cause health risks to the cellular phone user.

To address these concerns, communication headsets that are configured to place all electronic components necessary for telephone communication remote from the user's head have been developed. Specifically, U.S. Pat. No. 3,993,879 to Larkin discloses a headset assembly in which the microphone, receiver, and related amplifiers are housed in a detachable case that is worn on the user's belt or lapel while hollow transmitter and receiver tubes are coupled to the case to conduct sound from the user's mouth to the microphone and from the receiver to the user's ear.

However, the Larkin reference places the microphone and speaker in such close proximity to each other inside the case such that undesirable noise interference between the two devices can occur. For instance, sound that is emitted from the receiver and intended for the user's ear can be picked up by the microphone and retransmitted to the cell site, thereby create undesirable feedback. Similarly, sound generated by the user and intended for the microphone can reach the adjacent speaker and travel back to the user via the receiver tube next to the speaker. Disadvantageously, such sound wave interference generates extraneous noise that can adversely impact the clarity and overall quality of the communication. Furthermore, FIG. 2 of the Larkin reference illustrates that the case containing the microphone and speaker needs to be strapped to the user's belt, which suggests that the case is not compact and light enough to hang freely from the tubes that are attached to the user's head. Disadvantageously, it can be inconvenient and cumbersome for the user to have to attach such a case to the user's belt or clothing whenever the cellular phone is in use.

Hence from the foregoing, it will be appreciated that there is a need for a cellular telephone assembly that will permit the use of the cellular phone in a manner that reduces the risk of exposure to electromagnetic radiation and yet does not compromise the clarity of sound transmission. Furthermore, it will be appreciated that there is a need for the cellular telephone assembly to be lightweight and not cumbersome so that users can use the cellular phone without having to attach any device or contraptions to the users' clothing. To this end, there is a need for a cellular phone speaker and microphone assembly that is light, compact and configured to minimize noise interference between the speaker and microphone.

SUMMARY OF THE INVENTION

The aforementioned needs are satisfied by the cellular telephone speaker and microphone assembly of the present invention which permits the use of the cellular phone in a manner that reduces the user's exposure to electromagnetic radiation and also minimizes noise interference between the speaker and the microphone.

In one aspect, the cellular phone speaker and microphone assembly of the present invention comprises a microphone and a speaker that are contained in a first and second enclosure respectively. The assembly further comprises a connecting member that is joined to the first and second enclosures in a manner such that the connecting member is interposed between the first and second enclosures to inhibit sound transmission between the microphone and speaker. Preferably, the connecting member interposes an air gap between the enclosures to inhibit transmission of sound therebetween. In one embodiment, the connecting member comprises a first and second circular disk, and a plurality of legs extending therebetween to separate the first and second disks by a first distance. Preferably, the first distance is approximately 0.2 inch.

In another aspect, the cellular phone speaker and microphone assembly of the present invention comprises a microphone and speaker that are each contained in a first and second enclosure respectively. The first enclosure has an upper opening that is adapted for transmitting sound from the user's mouth to the microphone. The assembly further comprises an air tube that extends between the user's ear and the second enclosure so as to transmit sound from the speaker to the user's ear. In one embodiment, the first and second enclosures are adhered together.

In yet another aspect, the cellular phone assembly comprises a microphone and a speaker that are each contained in a first and second enclosure respectively. The first enclosure has a first cavity that is configured to seat and firmly hold the microphone inside the first enclosure and to channel substantially all sound entering an upper opening of the first enclosure to the microphone. Similarly, the second enclosure has a second cavity that is configured to seat and firmly hold the speaker inside the second enclosure and to channel substantially all sound from the speaker toward an upper opening in the second enclosure. Preferably, the first and second cavities are funnel shaped.

These and other objects and advantages of the present invention will become more fully apparent from the following description taken in conjunction with the accompanying drawings.

BRIEF DESCRIPTION OF THE DRAWINGS

FIG. 5 is a schematic drawing of a cellular telephone speaker and a microphone assembly according to yet another embodiment of the present invention.

DETAILED DESCRIPTION OF THE PREFERRED EMBODIMENT

Reference will now be made to the drawings wherein like numerals refer to like parts throughout. As will be described herein below, the cellular telephone speaker and microphone assembly of the preferred embodiment reduces noise interference between the speaker and the microphone when the speaker and microphone are stored inside a compact enclosure and positioned away from the user's head so as to reduce the user's exposure to electromagnetic radiation.

Figure 1:
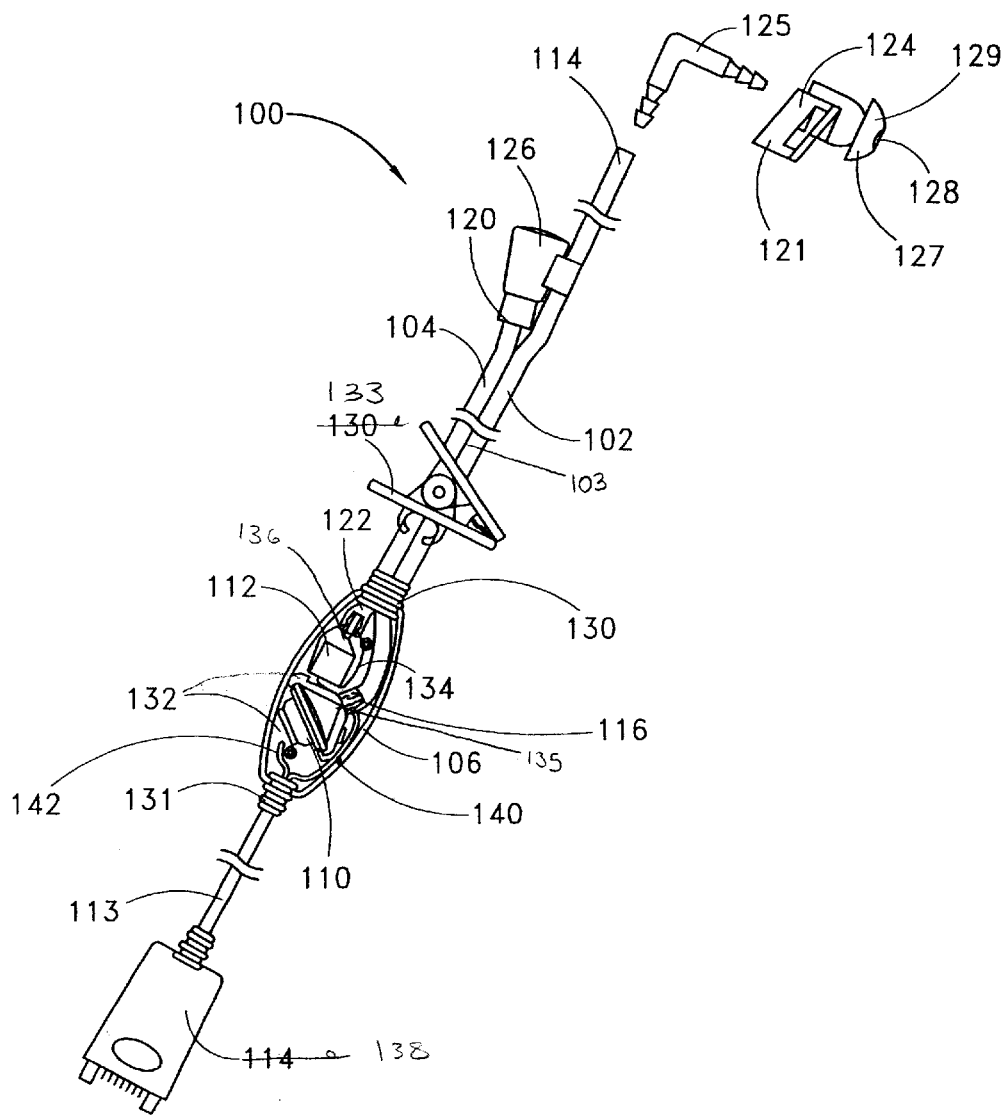
FIG. 1 is a schematic drawing illustrating a cellular telephone speaker and microphone assembly constructed according to the preferred embodiment of the present invention.

FIG. 1 illustrates a cellular telephone speaker and microphone assembly of the preferred embodiment. As shown in FIG. 1, the speaker and microphone assembly 100 generally comprises a pair of pneumatic or air tubes 102, 104 that are coupled to an enclosure 106 containing an audible sound speaker 110 and microphone 112. As FIG. 1 further illustrates, each air tube 102, 104 comprises an elongated hollow tubing that can be constructed from a number of known flexible, lightweight material. In one embodiment, the air tubes 102, 104 are made from a polyvinylchloride (PVC) tubing that is approximately one-fourth (¼") inch in outer diameter while in another embodiment, the tubing has an outer diameter that is approximately one-eighth (⅛") of an inch. However, it can be appreciated that the air tubes can have a variety of other different outer diameters without departing from the spirit of the invention, Furthermore, the first air tube 102 is configured to extend between the user's ear and the electronic speaker 110 in a manner such that a first end 114 of the tube 102 is to be positioned within the user's ear while a second end 116 of the tube 102 is extended into an upper opening 130 of the enclosure 106 and placed adjacent the speaker 110. Preferably, the first air tube 102 is positioned to transmit sound generated from the electronic speaker 110 to the user's ear. In one embodiment, an earpiece 124 is coupled to the first end 114 of the air tube 102 via a connector 125 to facilitate the insertion of the tube 102 into the user's ear and provide user comfort. Preferably, the earpiece 124 comprises a mushroom shaped acoustical foam 127 having an opening 128 formed on its outer wall 129 so as to permit sound transmission to the user's ear. Furthermore, the earpiece 124 comprises a slanted support piece 121 that is connected to the acoustical foam 127 and configured to fit over the user's outer ear in a manner so as to provide support for the ear. Preferably, the acoustical foam 127 is coupled to the support 121 in a manner so that they are substantially perpendicular to each other so that the support piece 121 is adjacent the user's ear lobe when the acoustical piece is placed inside the user's ear. Advantageously, the support 121 permits additional weight to be suspended from the tube that is connected to the earpiece without having the earpiece being pulled out of the user's ear.

Furthermore, the second air tube 104 is configured to extend between the user's mouth and the electronic microphone 112 in a manner such that a first end 120 of the air tube 104 is to be positioned immediately adjacent the user's mouth while a second end 122 of the tube 104 is extended into an upper opening 130 of the enclosure 106 and placed adjacent the microphone 112. Moreover, as it is also shown in FIG. 1, a stethoscope-type funnel mouthpiece 126 can be coupled to the first end 120 of the tube 104 so that sound generated by the user is channeled into the air tube 104 and transmitted to the microphone 112 in the enclosure 106.

Preferably, the air tubes 102, 104 are long enough to extend from the user's head to a location sufficiently far so that electromagnetic radiation generated at the location is likely to have minimal effect on the user. In one embodiment, the air tubes 102, 104 are approximately twenty four (24) inches and sixteen (16) inches long respectively. Furthermore, the outer walls of the air tubes 102, 104 are joined together for a first distance 103 extending from the enclosure 106 to a region near the user's head so as to facilitate ease of handling. In the region near the user's head, the air tubes 102, 104 are separated from each other so that the first tube 102 is extended toward the user's ear while the second tube 104 is extended toward the user's mouth. The outer walls of the air tubes 102, 104 can be joined together either by using an extrusion process or by using an attaching device 133 such as a clip or clasp as shown in FIG. 1 to hold the air tubes 102, 104 together. In another embodiment, the attaching device 133 can also be used to attach the enclosure 106 to the user's clothing.

Advantageously, the speaker and microphone assembly of the preferred embodiment utilizes elongated air tubes to transmit spoken words to and from the user so that all electromagnetic radiation generating devices such as the speaker, microphone, and cellular phone base can be positioned away from the vicinity of the user's head. As shown above, the speaker, microphone and cellular phone can be placed as least sixteen (16) inches away from the user's head. The air tubes 102, 104 are configured to transmit audible sound signals so that the transduction between the audible sound signals and electronic signals can take place at a location far enough from the user's head so that the user's contact with electromagnetic radiation is reduced. Furthermore, the air tubes 102, 104 are not made of metal and therefore will not act as an antenna attracting or amplifying electromagnetic radiation emanating from the cellular phone.

As described above in great detail, the second end 116, 122 of each air tube 102, 104 is extended into the enclosure 106. Preferably, the enclosure 106 is a compact case made of a lightweight plastic such as PVC or styrene so that it can be conveniently attached to the user's clothing. As FIG. 1 illustrates, the enclosure 106 of the preferred embodiment is a small bulb-shaped case; however it can be appreciated that the enclosure 106 can take on a wide variety of other shapes and sizes without departing from the spirit of the invention. Preferably, the volume of the enclosure 106 is less than 9 $cm^3$ and the weight of the enclosure is less than 0.3 ounces so that the enclosure 106 can suspend freely from the air tubes 102, 104 without pulling the earpiece 124 out of the user's ear when the first end 114 of the first air tube 102 is positioned inside the user's ear.

Moreover, as FIG. 1 further shows, inside the enclosure 106 are two separate capsules 132, 134 configured to house and substantially encapsulate the electronic speaker 110 and the microphone 112 respectively. Preferably, the capsules 132, 134 are constructed of a sound insulating material known in the art. In one embodiment, the first capsule 132 is positioned near a lower end 131 of the enclosure 106 while the second capsule 134 is placed above the first capsule 132, near an upper end 130 of the enclosure 106. Preferably, the capsules 132, 134 are constructed of a molded plastic such as PVC or styrene and each capsule 132, 134 has an opening 135, 136 that is adapted to receive the respective air tubes 102, 104. Preferably, each capsule 132, 134 is further encapsulated with a rubber material wherein the rubber material attenuates the vibration of the capsules and thereby reduce any noise interference that can be caused from such vibrations.

As FIG. 1 illustrates, inside the enclosure 106, the second end 116 of the first air tube 102 fits into the opening 135 of the first capsule 132 containing the electronic speaker 110 so that all sound from the speaker 110 are channeled into the air tube 102 and transmitted to the user's ear. Similarly, the second end 122 of the second air tube 104 fits into the opening 136 of the second capsule 134 containing the microphone 112 so that sound waves transmitting down the second air tube 104 intended for the microphone will not scatter and travel back to the user through the first air tube 102. Preferably, the openings 135, 136 on each capsule 132, 134 are sized to form a tight fit with the air tubes 102, 104 so that practically all sound waves traveling to and from the electronic speaker and microphone are channeled through the appropriate air tube 102, 104. Furthermore, it can be appreciated that in other embodiments, a wall can be formed inside the enclosure to separate the speaker from the microphone which will essentially serve the same purpose as the capsules in inhibiting sound transmission between the speaker and microphone. Similar to the capsules, the wall can be configured to separate the enclosure into two distinct compartments where the speaker and microphone can be separately housed.

As such, the electronic speaker 110 and microphone 112 are isolated from each other so that noise interference between the two devices is reduced. Specifically, separate encapsulation of the electronic speaker 110 and microphone 112 inside the enclosure 106 inhibits sound waves produced by the speaker 110 from reaching the adjacent microphone 112 and vice versa. It is generally known that a microphone transmits sound by converting a mechanical signal such as sound waves vibrating against a membrane into an electrical one. In particular, the microphone 112 typically comprises a coil connected to the membrane and suspended close to a small magnet. The coil in the microphone moves in the magnetic field when sound waves strike the membrane thereby inducing an electromotive force (emf) that is proportional to the velocity of the sound waves. In the preferred embodiment, the capsules 132, 134 are configured to isolate the electronic speaker from the microphone 112 so that sound waves generated from the speaker will not strike the membrane of the microphone 112 and create an echo effect at the other end of the transmission. In another embodiment, each capsule 132, 134 is filled with a sound insulating material such as polyurethane foam or silicone to further reduce the transmission of sound between the electronic speaker 110 and the microphone 112.

As FIG. 1 further illustrates, the speaker 110 and the microphone 112 of the assembly 100 are each connected to an electrical wire 140, 142. The electrical wires 140, 142 extend through the lower opening 131 of the enclosure 106 into the electrical conduit 113 and provide electrical connection for the speaker 110 and microphone 112. In the embodiment as shown in FIG. 1, the electrical conduit 113 is approximately twenty four (24) inches long and is constructed of a generally known electrically insulating material. Furthermore, the electrical conduit 113 is coupled to a plug 138 which is configured to mate with a jack on the cellular phone or to some other communication console. It is generally known that the jack on the cellular phone in particular can transmit audible sound signals either to or from the telephone by using a speaker and microphone transducer that converts the audible sound signals into electronic signals and vice-versa.

Figure 2:
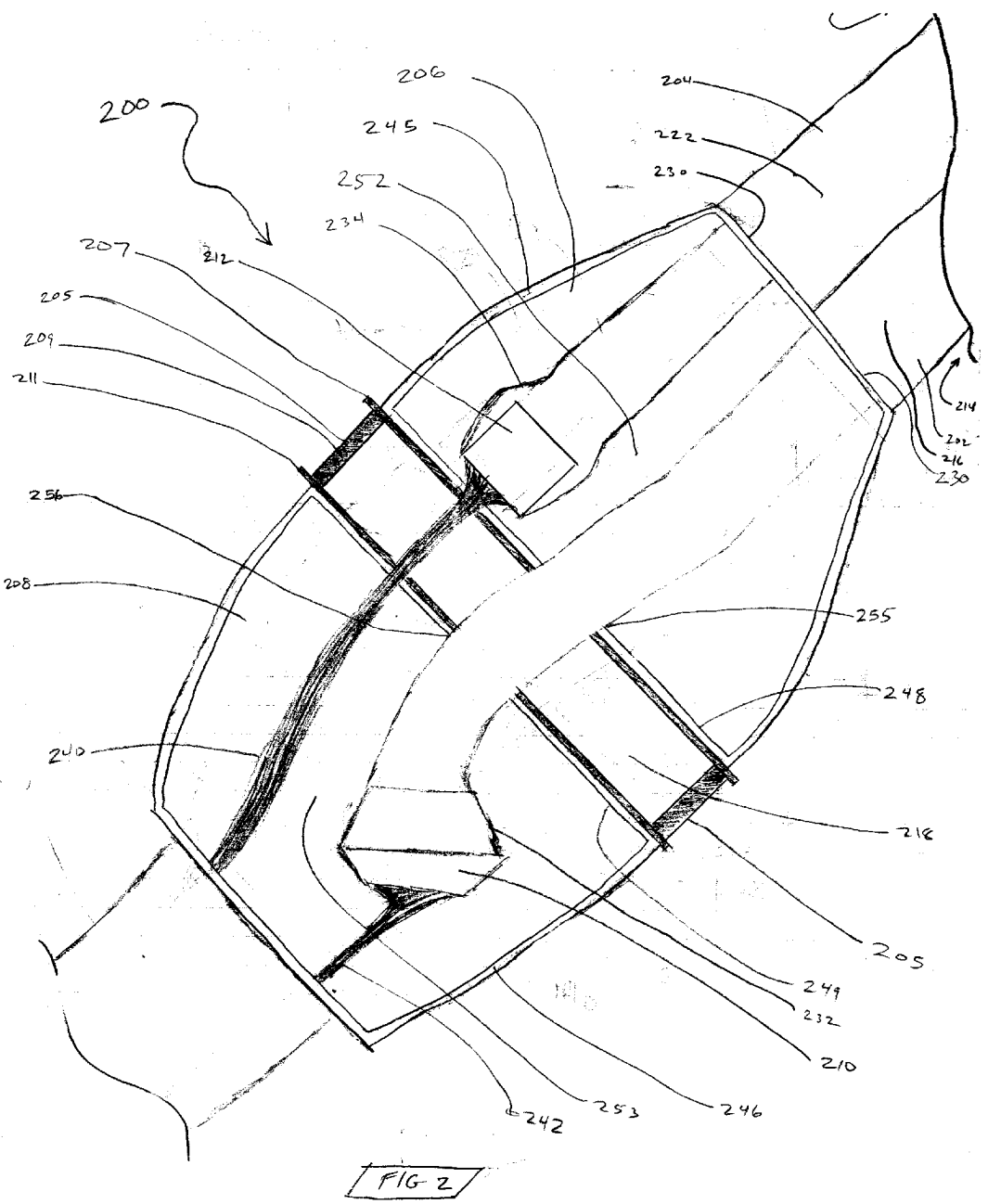
FIG. 2 is a schematic drawing of a cellular telephone speaker and microphone assembly constructed according to another embodiment of the present invention.

FIG. 2 illustrates an exploded sectional view of another embodiment of a cellular telephone speaker and microphone assembly 200 of the present invention. As shown in FIG. 2, the assembly 200 generally comprises a microphone 212 that is enclosed in a first enclosure 206 and a speaker 210 that is enclosed in a separate second enclosure 208. Furthermore, as it will be described in greater detail below, the first and second enclosures 206, 208 are joined together in a manner such that the enclosures are separated by an air gap 218 so as to further inhibit sound transmission between the microphone 212 and speaker 210.

In one embodiment, the first and second enclosures 206, 208 each comprises a dome shaped housing 245, 246 that extends from a circular base 248, 249 and defines a cavity 252, 253 therein. As FIG. 2 further shows, the first and second enclosures 206, 208 are joined together by way of a connecting member 209. The connecting member 209 connects the two enclosures 206, 208 to form a single, compact case while at the same time interposes an air gap 218 between the enclosures to further reduce noise and vibrational interference between the microphone 212 and speaker 210. In one embodiment, the connecting member 209 has a first surface 207, a second surface 211, and a plurality of legs 205 extending therebetween so as to create the air gap 218 between the surfaces 207, 211.

The connecting member 209 joins the enclosures 206, 208 together by coupling its first surface 207 to the base 248 of the first enclosure 206 and its second surface 211 to the base 249 of the second enclosure 208. The air gap 218 between the first and second surfaces 207, 211 of the connecting member 209 is thus positioned between the first and second enclosures 206, 208, further isolating the enclosures 206,

208 from each other. However, it can be appreciated that the enclosures 206, 208 can take on a wide variety of other shapes and sizes without departing from the scope of the present invention. Preferably, the enclosures 206, 208 and connecting member 209 are made of a lightweight plastic material such as PVC or styrene so as not to encumber the user. In one embodiment, the combined weight of the enclosures 206, 208 is less than 0.4 ounces and the combined volume of the enclosures is less than 9 cm$^3$. The assembly 200 further comprises a first pneumatic air tube 204 which is connected to the microphone 212 and a second pneumatic air tube 202 which is connected to the speaker 210. These air tubes 204, 202 are made of the same material and function in the same manner as described above in relation to air tubes 104, 102, The first air tube 204 is configured to extend between the user's mouth and the electronic microphone 212 in a manner such that a first end 220 of the air tube 204 is positioned immediately adjacent the user's mouth while a second end 222 of the tube 204 is extended into an upper opening 230 of the first enclosure 206 and placed adjacent the microphone 212.

Furthermore, the second air tube 202 is configured to extend between the user's ear and the electronic speaker 210. In one embodiment, the first end 214 of the tube 202 is to be positioned within the user's ear while a second end 216 of the tube 202 is extended into an upper opening 230 of the first enclosure 206, through an opening 255 in the first surface 207 of the connecting member 209, along the length of the air gap 218, and into an opening 256 in the second surface 211 of the connecting member 209. Inside the second enclosure, the second end 216 of the tube 202 is placed adjacent the speaker 210. Preferably, the second air tube 202 is positioned to transmit sound generated from the electronic speaker 210 to the user's ear.

As is further shown in FIG. 2, the first air tube 204 is connected to a first capsule 234 which encapsulates the microphone 212 inside the first enclosure 206. Similarly, the second air tube 204 is connected to a second capsule 232 which encapsulates the speaker 210 inside the second enclosure 208. The connection between the air tubes 202, 204 and the capsules 234, 232 is similar to the connection between the air tubes 102, 104 and the capsules 134, 132 as shown and described in FIG. 1 above. The capsules 234, 232 also function in the same manner as described above in relation to capsules 134, 132 of FIG. 1. Furthermore, the microphone 212 and the speaker 210 are each respectively connected to an electrical wire 240, 242. The wires 240, 242 establish electrical connection for the microphone 212 and the speaker 210 in the same manner as described above in relation to electrical wires 140, 142 of FIG. 1.

As such, the electronic speaker 210 and microphone 212 are isolated from each other so that noise interference between the two devices is reduced. Specifically, maintaining the air gap 218 between the first and second enclosures 206, 208 further inhibits sound waves produced by the speaker 210 from reaching the microphone 212 and vice versa because sound waves generally propagate less efficiently when moving through a gas, like air. Furthermore, the addition of the first capsule 234 allows for sound waves produced by the user to be channeled directly from the first air tube 204 into the microphone 212. Likewise, addition of the second capsule 232 allows for sound waves produced by the speaker 210 to be channeled directly into the second air tube 202 and up to the user's ear. By channeling the sound waves in this manner, there is less chance for sound waves generated by the speaker 210 to reach the microphone 212 and vice versa.

Figure 3:
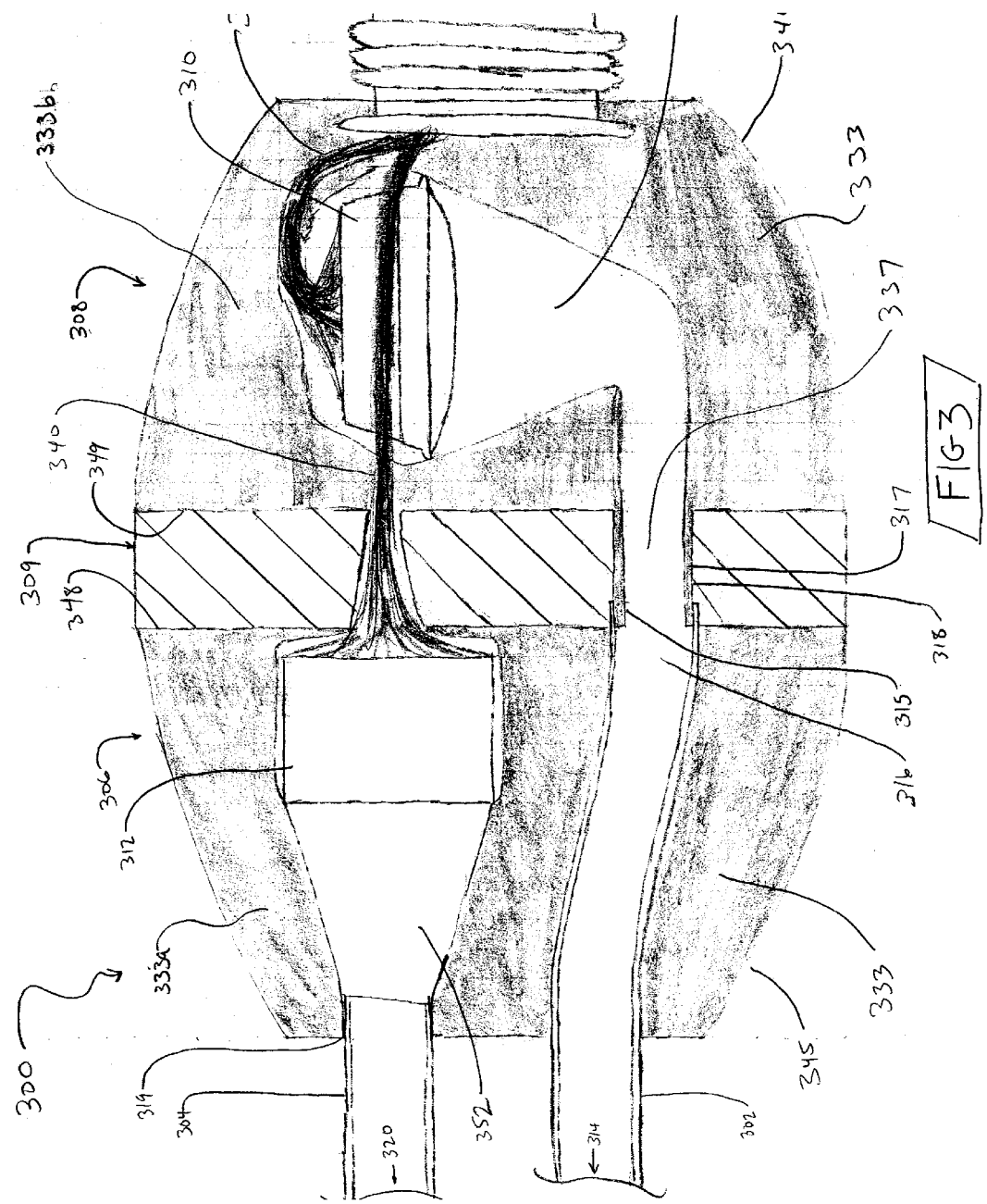
FIG. 3 is a schematic drawing of a cellular telephone speaker and microphone assembly constructed according to another embodiment of the present invention.

FIG. 3 illustrates an exploded sectional view of another embodiment of a cellular telephone speaker and microphone assembly 300 of the present invention. As shown, the assembly 300 generally comprises a first enclosure 306 containing a microphone 312 and a second enclosure 308 containing a speaker 310. A connecting member 309 joins the enclosures 306, 308 in a manner to be described in more detail below such that the microphone 312 and the speaker 310 are sufficiently isolated from each other. In general, all components of the speaker and microphone assembly 300 comprise the same materials and weighs approximately the same as the speaker and microphone assembly 200 shown and described above in FIG. 2 unless otherwise noted.

In one embodiment, the first and second enclosures 306, 308 each comprises a first and second dome shaped housing 345, 346 that extends from a circular base 348, 349. Each housing 345, 346 has a relatively thick wall 333$a$, 333$b$ that defines a cavity 352, 353 respectively. The cavity 352 within the first enclosure 306 is preferably shaped in a manner such that the wall 333$a$ of the first housing 345 closely encompasses the periphery of the microphone 312. Similarly, the cavity 353 of the second enclosure 308 is shaped in a manner such that the wall 333$b$ of the second housing 346 closely encompasses the periphery of the speaker 310. Advantageously, the cavities 352, 353 are configured to provide a tight fitting seat for the microphone 312 and the speaker 310 thereby preventing excessive shifting of the microphone 312 and the speaker 310.

As FIG. 3 further shows, the cavity 352 of the first housing 345 is funnel-shaped so that sound can be channeled directly into the microphone in a manner to be discussed in further detail below. Likewise, the cavity 353 of the second housing 346 is also funnel-shaped so that sound emanating from the speaker can be channeled directly to the user in a manner to be discussed in further detail below. Also, it should be noted that the funnel-shaped cavities 352, 353 eliminate the need for separate capsules that are used in other embodiments of the assembly and thus the cavities 352, 353 reduce the manufacturing cost of the assembly 300.

In the preferred embodiment, the second enclosure 308 also comprises a cylindrical post 317, extending through the circular base 349 of the second enclosure 308. The post 317 comprises an inner surface 315 which defines a channel 337. The channel 337 is positioned adjacent to the funnel-shaped cavity 353 so as to provide a path for sound waves emanating from the speaker 310 in a manner to be described in further detail below.

The connecting member 309 shown in FIG. 3 fits into the assembly 300 in the same manner as described above in relation to the connecting member 209 shown and described above in FIG. 2. In one embodiment, the connecting member 309 has a first and second surface that are separated by legs so as to create an air gap between the surfaces. As noted above, the air gap provides further isolation of the speaker and the microphone. In another embodiment, the connecting member 309 is a substantially solid, cylindrical shaped structure. Preferably, the connecting member 309 is made from a sound insulating material known in the art.

In another embodiment not shown, no connecting member is included. Instead, the two enclosures 306, 308 are joined together directly using glue or another similar joining process known in the art. More specifically, the circular bases 348, 349 are joined together directly. In this embodiment, the connecting member is not necessary because the sound dampening properties of the enclosures alone are sufficient Advantageously, eliminating the need for the connecting member cuts the cost o manufacturing and assembling the speaker and microphone assembly 300, and it also reduces the weight of the assembly 300 thereby making the assembly 300 more manageable for the user.

The assembly 300 shown in FIG. 3 also comprises a first pneumatic air tube 304 that extends between the user's mouth and the electronic microphone 312. In particular, a first end 320 of the air tube 304 is placed immediately adjacent the user's mouth while a second end 322 of the tube 304 extends into an upper opening 319 of the first enclosure 306 and lies adjacent to the microphone 312. Preferably, the opening 319 is sized such that the air tube 304 fits tightly through the opening 319 so that substantially all of the sound originating at the user's mouth will be directed into the microphone so as to improve the clarity and quality of sound transmission.

Similarly, the assembly 300 also comprises a second pneumatic air tube 302 that extends between the user's ear and the electronic speaker 310. In one embodiment, the first end 314 of the tube 302 is to be positioned within the user's ear while a second end 316 of the tube 302 is extended into an upper opening 330 of the first enclosure 306, The second end 316 of the tube 302 further extends through the opening 318 in the connecting member 309 and tits around the post 317 of the second enclosure 308. In this manner, sound waves emanating from the speaker 310 are directed by the funnel-shaped cavity 353 into the channel 337 and into the second air tube 302. Then the sound waves travel through the second air tube 302 into the user's ear. Advantageously, the routing of this air tube ensures that substantially all of the sound originating at the speaker 310 will be directed into the air tube 302. Thus, because all sound is directed to its intended destination, there is little chance for sound originating at the speaker 310 to travel to the microphone 312 and vice versa to cause interference.

In another embodiment (FIG. 5), the assembly 300 comprises only one pneumatic air tube extending between the user's ear and the speaker 310. The tube functions in the same matter as the pneumatic air tube 302 described above. In this embodiment, however, the user speaks directly into the first enclosure 306 and into the microphone 312 through the opening 319 in the first enclosure 306. Preferably, the pneumatic air tube is approximately 10 inches long, in order to allow the microphone 312 to be positioned sufficiently close to the user's mouth.

Figure 4:
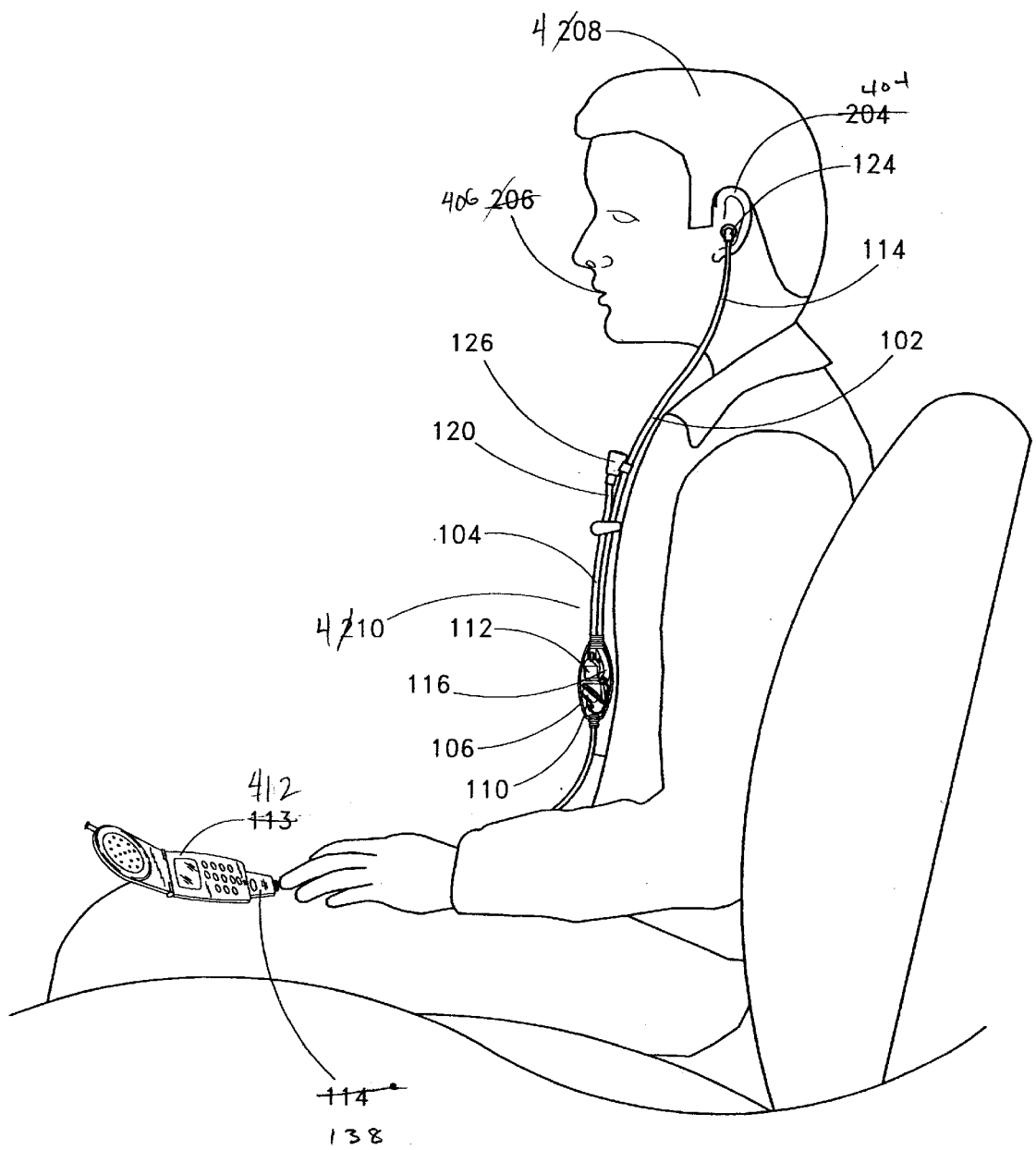
FIG. 4 is a perspective view of the assembly of FIG. 1 which shows the manner in which the cellular telephone speaker and microphone assembly of FIG. 1 is used.

FIG. 4 illustrates the manner in which the cellular phone speaker and microphone assembly 100 of the preferred embodiment is used. As shown in FIG. 4, the earpiece 124 coupled to the first end 114 of the first air tube 102 is preferably placed inside the user's ear 404 while the mouth piece 126 coupled to the first end 120 of the second air tube 104 is positioned near the user's mouth 406. As described above in great detail, the first air tube 102 extends between the user's ear 404 and the speaker 110 so as to transmit sound from the electronic speaker to the user. Moreover, the second air tube 104 extends between the user's mouth 406 and the microphone 112 so as to transmit spoken words from the user to the microphone. As such, the user can use the cellular phone 412 without having to place the electronic speaker or microphone adjacent the user's head 408.

FIG. 4 further shows that the speaker 110 and microphone 112 are stored inside the enclosure 106 while the enclosure 106 is placed remote from the user's head 408. Furthermore, the speaker 110 and microphone 112 are in turn electrically connected to a cellular phone 412 via the plug 138. Thus, the setup permits all electromagnetic radiation generating devices such as the speaker 110, microphone 112, and cellular phone 412 to be located at a distance from the user's head 408. As such, the user's exposure to electromagnetic radiation is greatly reduced. Furthermore, the speaker 110 and microphone 112 are compactly stored inside the enclosure 106 as shown in FIG. 4, thus permitting the speaker and microphone to be conveniently carried by the user. In one embodiment, the enclosure 106 can suspend freely from the air tubes 102, 104 while the earpiece 124 is positioned inside the user's ear. Advantageously, the enclosure 106 is sufficiently light and compact so as to be able to hang freely from the air tubes 102, 104 without requiring the user to attach the enclosure to an article of clothing. However, in other embodiments, the enclosure 106 can also be detachably affixed to the user's clothing 410 and carried by the user as the user moves from location to location. Preferably, the entire assembly 100 weighs less than 1 ounce. The lightness of the assembly 100 also permits users to speak into the mouthpiece 126 while the mouthpiece is suspended freely as shown in FIG. 4. Furthermore, since the speaker 110 and microphone 112 are placed adjacent each other inside the compact enclosure 106, they are individually encapsulated inside the enclosure 106 to reduce sound transmission between the two devices when the phone is in use.

Advantageously, the microphone and speaker assembly of the present invention permits spoken words to be transmitted between the user and the cellular phone with minimal extraneous noise while the electronic microphone, speaker, cellular phone base, and other electromagnetic radiation generating devices are positioned remote from the user's head so that user's contact with electromagnetic radiation is reduced without substantially compromising the quality of the sound transmission. Furthermore, the cellular phone assembly reduces noise interference between the electronic speaker and microphone of a cellular phone while permitting the speaker and microphone to be compactly stored inside a single, small and lightweight enclosure. Furthermore, the cellular phone assembly is comprised of light and compact parts so as that it is convenient and not cumbersome to use.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions, but should be defined by the appended claims.

What is claimed is:

1. A speaker and microphone assembly for a cellular telephone, comprising:
   a speaker;
   a microphone;
   a first enclosure containing the microphone and a second enclosure containing the speaker;
   a connecting member joined to the first and second enclosures in a manner such that the connecting member is interposed between the first and second enclosures to inhibit sound transmission between the microphone and speaker;
   a first air tube having a first end positioned near the user's mouth for transmitting sound therefrom and a second end positioned adjacent the microphone in the first enclosure for transmitting sound thereto;
   a second air tube having a first end positioned within the user's ear for transmitting sound thereto and a second end positioned adjacent the speaker in the second enclosure for transmitting therefrom; and a plug electrically connected to the speaker and microphone wherein the plug is adapted to plug into the cellular phone so as to transmit and receive audio signals directly to and from the cellular telephone, wherein each of the first and second air tubes are connected to the same side of an enclosure.

2. The assembly of claim 1 wherein the connecting member comprises a first and second surface separated by an air gap therebetween, the connecting member is joined to the first and second enclosures in a manner such that the air gap is interposed between the first and second enclosures to inhibit transmission of sound between the speaker and the microphone.

3. The assembly of claim 2 wherein the connecting member comprises a first and second circular disk and a plurality of legs extending therebetween to separate the first and second disks by a first distance.

4. The assembly of claim 3 wherein the first distance between the first and second disks is approximately 0.2 inch.

5. The assembly of claim 3 wherein the connecting member comprises a rubber material.

6. The assembly of claim 1 further comprises a first and second capsule wherein the first capsule substantially encapsulates the microphone inside the first enclosure and the second capsule substantially encapsulates the speaker inside the second enclosure wherein the first and second capsules inhibit sound transmission between the microphone and the speaker.

7. The assembly of claim 6 further comprises an insulating material that encloses the first and second capsules so as to attenuate vibration of the capsules and thereby reduce any noise interference that may result.

8. The assembly of claim 6 wherein the first capsule has a first opening that is adapted to receive the second end of the first air tube in a manner such that substantially all sound transmitted from the user's mouth via the first air tube is channeled to the microphone.

9. The assembly of claim 6 wherein the second capsule has a second opening that is adapted to receive the second end of the second air tube in a manner such that substantially all sound transmitted from the speaker is channeled into the second air tube.

10. The assembly of claim 1 wherein the first end of the first air tube is coupled to a mouthpiece.

11. The assembly of claim 10 wherein the mouthpiece comprises a stethoscope type funnel wherein the mouthpiece suspends freely while the user speaks into the mouthpiece.

12. The assembly of claim 1 wherein the first end of the second air tube is coupled to an ear piece.

13. The assembly of claim 12 wherein the ear piece comprises an acoustical piece and a support piece wherein the acoustical piece is positioned inside the user's ear and the support piece is coupled to the acoustical piece and configured to fit over the outside of the ear so as to provide support for the ear.

14. The assembly of claim 13 wherein the acoustical piece and the support piece are coupled in a manner so as to be substantially perpendicular to each other so that when the acoustical piece is placed inside the user's ear, the support piece is adjacent the earlobe of the user.

15. The assembly of claim 14 wherein the acoustical piece is substantially mushroom shaped and has an opening configured to transmit sound to the user's ear.

16. The assembly of claim 1 wherein the first and second air tubes extend from the user's head to a location sufficiently far so as to reduce electromagnetic radiation exposure to the user's head.

17. The assembly of claim 1 wherein the first and second air tubes comprise a polyvinylchloride material.

18. The assembly of claim 1 wherein the first and second air tubes each comprises an outer wall wherein the outer walls of the air tubes are connected together for a first distance extending from the first enclosure to a region near the user's head, wherein the outer walls of the first and second air tubes are separated from each other in the region near the user's head so that the first air tube can extend to an area adjacent the user's mouth and the second air tube can extend to the user's ear.

19. The assembly of claim 1 wherein the first and second enclosures comprise a plastic material.

20. The assembly of claim 1 wherein the first and second enclosures are substantially dome shaped.

21. The assembly of claim 20 wherein the combined volume of the first and second enclosures is less than 9 cm$^3$.

22. The assembly of claim 21 wherein the combined weight of the first and second enclosure containing the speaker and microphone is less than 0.3 ounce.

23. The assembly of claim 22 wherein the assembly weighs less than 0.9 ounce.

24. The assembly of claim 1 wherein the first air tube is approximately sixteen (16) inches long.

25. The assembly of claim 1 wherein the second air tube is approximately twenty-four (24) inches long.

26. A speaker and microphone assembly for a cellular telephone, comprising:

a speaker;

a microphone;

a first enclosure containing the microphone wherein the first enclosure has an opening that is adapted for transmitting sound through air from the user's mouth to the microphone without a tube;

a second enclosure containing the speaker;

a connecting member joined to the first and second enclosures in a manner such that the first and second enclosures are adjacent in a single case and the connecting member is interposed between the first and second enclosures to inhibit sound transmission between the speaker and microphone;

an air tube having a first end wherein the first end is positioned within the user's ear for transmitting sound thereto and a second end wherein the second end is positioned in the second enclosure for transmitting sound therefrom; and a plug electrically connected to the speaker and microphone wherein the plug is adapted to plug into the cellular phone so as to transmit and receive audio signals directly to and from the cellular telephone.

27. The assembly of claim 26 wherein the connecting member comprises a first and second surface separated by an air gap therebetween, the connecting member is joined to the first and second enclosures in a manner such that the air gap is interposed between the first and second enclosures to inhibit transmission of sound between the speaker and the microphone.

28. The assembly of claim 26 wherein the connecting member comprises a substantially solid cylindrical disk that is approximately 0.3 inch high.

29. The assembly of claim 26 wherein the combined volume of the first and second enclosures is less than 9 cm$^3$.

30. The assembly of claim 29 wherein the combined weight of the first and second enclosures is less than 0.4 ounces.

31. A speaker and microphone assembly for a cellular telephone, comprising:
- a speaker;
- a microphone;
- a first enclosure containing the microphone wherein the first enclosure has a first cavity therein, the first cavity is configured to seat and firmly hold the microphone inside the first enclosure and to channel substantially all sound entering an upper opening of the first enclosure to the microphone;
- a second enclosure containing the speaker wherein the second enclosure has a second cavity therein, the second cavity is configured to seat and firmly hold the speaker inside the second enclosure and to channel substantially all sound from the speaker toward an upper opening in the second enclosure;
- a connecting member joined to the first and second enclosures in a manner such that the connecting member is interposed between the first and second enclosures to inhibit sound transmission between the speaker and microphone, the first enclosure, second enclosure and connecting member together defining a total volume of less than about 9 cm$^3$;
- a first air tube having a first end wherein the first end is positioned near the user's mouth for transmitting sound therefrom and a second end wherein the second end is positioned adjacent the upper opening of the first enclosure for transmitting sound thereto;
- a second air tube having a first end wherein the first end is positioned within the user's ear for transmitting sound thereto and a second end wherein the second end is positioned adjacent the second enclosure for transmitting sound therefrom; and
- a plug electrically connected to the speaker and microphone wherein the plug is adapted to plug into the cellular phone so as to transmit and receive audio signals directly to and from the cellular telephone,
- wherein both of the first and second air tubes are connected to a same side of an enclosure.

32. The assembly of claim 31 wherein the first and second cavities are funnel-shaped.

33. The assembly of claim 31 wherein the connecting member comprises a first and second surface separated by an air gap therebetween, the connecting member is joined to the first and second enclosures in a manner such that the air gap is interposed between the first and second enclosures to inhibit transmission of sound between the speaker and the microphone.

34. A speaker and microphone assembly for a cellular telephone, comprising;
- a speaker;
- a microphone;
- a first enclosure containing the microphone;
- a second enclosure containing the speaker wherein the second enclosure is coupled to the first enclosure;
- a first air tube having a first end positioned near the user's mouth for transmitting sound therefrom and a second end positioned adjacent the microphone in the first enclosure for transmitting sound thereto;
- a second air tube having a first end positioned within the user's ear for transmitting sound thereto and a second end positioned adjacent the speaker in the second enclosure for transmitting therefrom; and
- a plug electrically connected to the speaker and microphone wherein the plug is adapted to plug into the cellular phone so as to transmit and receive audio signals directly to and from the cellular telephone;
- wherein both of the first air tube and the second air tube are connected to a same one of the first and second enclosures.

35. The assembly of claim 34 wherein the first and second enclosures comprise a plastic material.

36. The assembly of claim 34 wherein the first and second enclosures are substantially dome-shaped.

37. The assembly of claim 36 wherein the combined volume of the first and second enclosures is less than 9 cm$^3$.

38. The assembly of claim 37 wherein the assembly weighs less than 0.9 ounce.

39. The assembly of claim 34 wherein the first enclosure has a first cavity therein, and the first cavity is configured to seat and firmly hold the microphone inside the first enclosure and to channel substantially all sound entering an upper opening of the first enclosure to the microphone.

40. The assembly of claim 34 wherein the second enclosure has a second cavity therein, and the second cavity is configured to seat and firmly hold the speaker inside the second enclosure and to channel substantially all sound from the speaker toward an upper opening in the second enclosure.

41. The assembly of claim 34 wherein the first enclosure has a first circular base and the second enclosure has a second circular base where the first and second circular bases are joined together.

42. A speaker and microphone assembly for a cellular telephone, comprising
- a speaker;
- a microphone;
- a first enclosure containing the microphone wherein the first enclosure has an opening that is adapted for transmitting sound directly from the user's mouth to the microphone without an air tube;
- a second enclosure containing the speaker;
- a connecting member joined to the first and second enclosures in a manner such that the first and second enclosures are adjacent in a single case and the connecting member is interposed between the first and second enclosures;
- an air tube having a first end wherein the first end is positioned adjacent the user's ear for transmitting sound thereto and a second end wherein the second end is positioned in the second enclosure for transmitting sound therefrom; and
- a plug electrically connected to the speaker and microphone wherein the plug is adapted to plug into the cellular telephone so as to transmit and receive audio signals directly to and from the cellular telephone.

43. The assembly of claim 42 wherein the first end of the air tube is coupled to an airpiece.

44. The assembly of claim 42 wherein the combined volume of the first and second enclosures is less than 9 cm$^3$.

45. The assembly of claim 44 wherein the combined weight of the first and second enclosures is less than 0.4 ounces.

46. The assembly of claim 42 wherein the combined weight of the first and second enclosures is less than 0.4 ounces.

* * * * *